Figure 3:
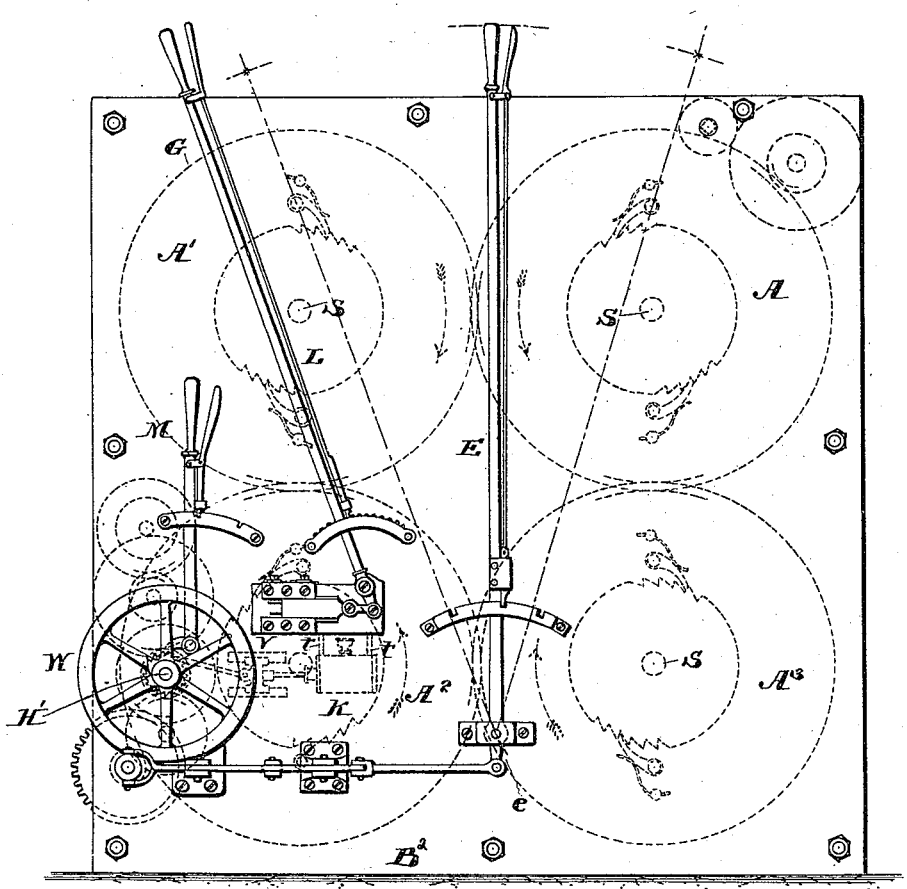

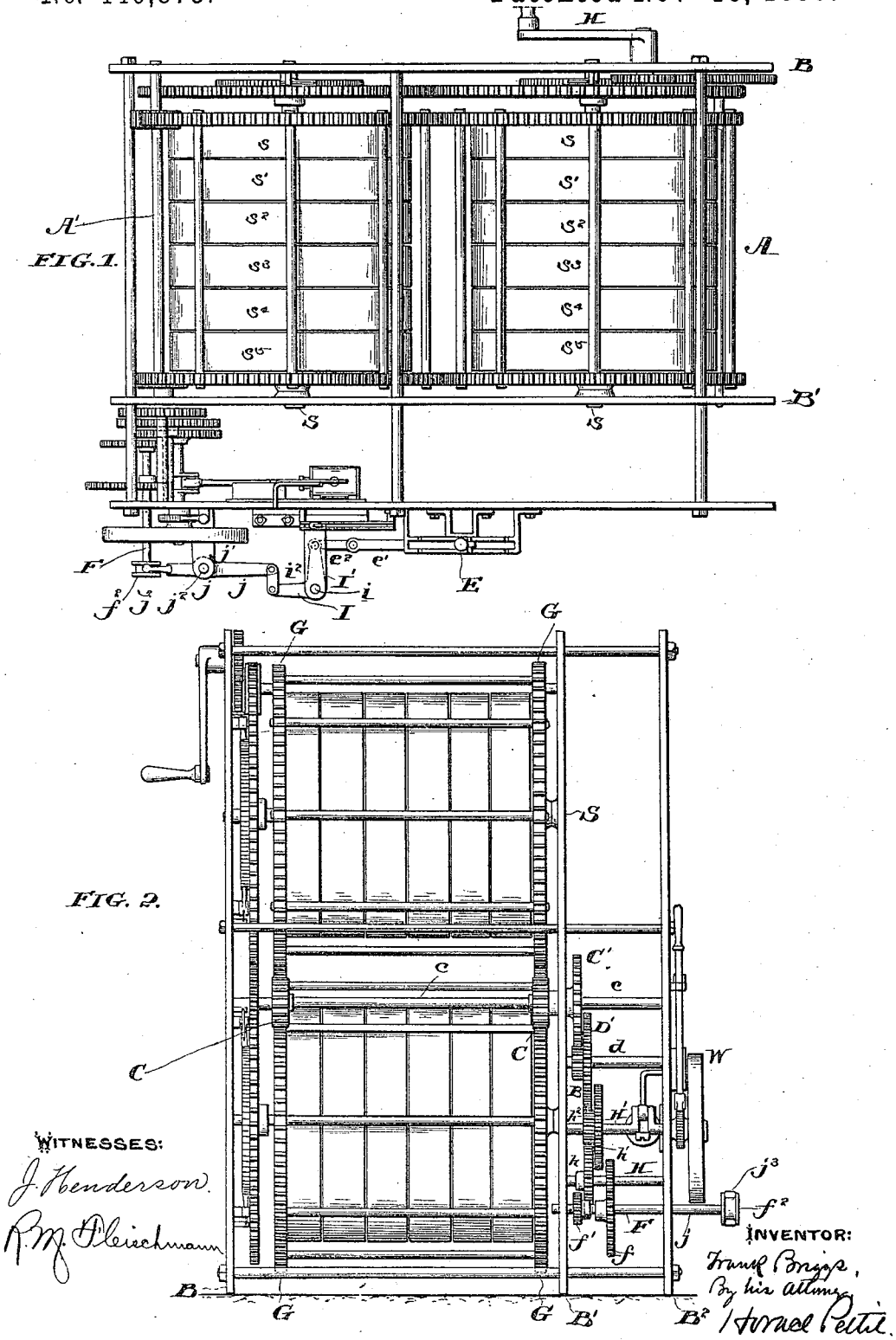

(No Model.) 2 Sheets—Sheet 2.

F. BRIGGS.
SPRING MOTOR.

No. 440,873. Patented Nov. 18, 1890.

WITNESSES:
J. Henderson.
R. M. Fleischmann

INVENTOR:
Frank Briggs.
By his Attorney,
Horace Pettit.

UNITED STATES PATENT OFFICE.

FRANK BRIGGS, OF PHILADELPHIA, PENNSYLVANIA.

SPRING-MOTOR.

SPECIFICATION forming part of Letters Patent No. 440,873, dated November 18, 1890.

Application filed July 23, 1890. Serial No. 359,655. (No model.)

*To all whom it may concern:*

Be it known that I, FRANK BRIGGS, of the city of Philadelphia, and State of Pennsylvania, have invented a certain new and useful Improvement in Spring-Motors; and I do hereby declare the following to be a full, clear, and exact description thereof, reference being had to the accompanying drawings, forming part of this specification.

My invention has relation to motors propelled by spring-power; and it consists in an improved spring-propelled motor composed of a combination of springs wound on two or more drums, each of the said drums connected with each other by toothed gear-wheels, by which the total force of the combined springs is communicated to and connected with a single shaft or gear-wheel, and from thence directly or indirectly the power is transmitted through a system of gear-wheels to the weight to be operated, or to the wheels of the vehicle or other machinery to be propelled; and my invention consists, further, in a system of levers and gear-wheels connected to and in combination with the gearing of the motor for controlling at will the direction of the gearing directly operating upon the weight or operating the wheels of the vehicle.

The object of my invention is to provide a spring-motor which, by the construction hereinafter described, shall be capable of lifting any desired weight or driving machinery and vehicles of any desired capacity at any desired speed within reasonable limits.

My invention is particularly applicable to road-vehicles, tram-cars, and machinery generally; and it is my object to provide a motor of sufficient horse-power capacity to drive heavy loads, which at the same time may be so constructed as to occupy but a comparatively small space.

I am aware that numerous spring-motors have been invented in which two or more springs on two or more drums have been employed. I do not, however, broadly claim the combination of two or more springs on two or more drums in a spring-motor, but refer to the construction of motor as herein described, and as particularly claimed in the claims hereto annexed.

I also preferably employ, in combination with my improved spring-motor herein described and claimed, the air governor and regulator shown in the drawings, which is described and claimed in a separate pending application filed by me in the United States Patent Office June 14, 1890, Serial No. 355,417, though other regulators and brakes for regulating and controlling the speed of the motor may be employed.

In the accompanying drawings, as a matter of illustration, I show and describe four spring-drums, each provided with six separate flat coiled springs, though other numbers of drums for increasing the power may be employed and other numbers of flat coiled springs on each drum, as desired.

In the drawings similar letters of reference refer to similar parts throughout.

Figure 1 is a plan view of my improved motor, showing the connection of various parts. Fig. 2 is an end elevation. Fig. 3 is a side elevation showing the operating and controlling levers and the regulator-lever, with the gearing-connections and drums in dotted lines.

The drums A A' A² A³ are secured in position within the walls of the motor between the sides B B' on their several respective axles or shafts S, and each of the drums in the construction shown in the drawings are provided with six separately coiled and secured independent flat coiled springs $s\ s'\ s^2\ s^3\ s^4\ s^5$. These springs are secured to the several respective drums by having their ends affixed to the drum in any well-known manner. Each drum is provided on its circumference, preferably at both sides, with a large serrated or toothed gear-wheel G. The gear-wheels on each drum work into and operate or are operated by similar gear-wheels on two of the other drums. The springs on all the drums are wound up to the proper tension by the handle H by the system of gearing shown in the drawings, or any well-known system of gearing constructed to wind all the drums at the same time and the springs to the same tension. The inner ends of the flat coiled springs on each drum are secured to the respective axles of each drum, and as these axles are rotated in the proper direction by means of the handle H the springs of the drums are wound tightly upon the same. A system of several gear-wheels operating in each other imparts the rotation from the handle H to the respective axles of the drums.

The combined power of the drums is connected through the medium of the gear-wheels G to the gear-wheel on the drum $A^2$, and from thence to the small gear-wheels C, provided on the shaft $c$, which has its journal-bearing in the walls of the motor. The power is thence communicated from the shaft $c$ to the shaft $d$ through the medium of the gear-wheels C' and D, and so on, as may be desired.

E is a regulating-lever regulating and controlling the direction desired to be given to the vehicle propelled, and is pivoted or hinged to the outside of the wall $B^2$ of the motor at the point $e$. Between the walls B' $B^2$ is journaled a laterally-adjustable axle or shaft F, provided with the toothed gear-wheels $f f'$ of different diameters, adapted to engage in the gear-wheels $h$, provided on the shaft H and in the gear-wheel $h'$, provided on the shaft H', respectively, to which said shaft H' power is communicated from the shaft $d$ through the medium of the toothed wheel D' and the toothed wheel $h^2$. A lateral adjustment of the shaft is effected by the to-and-fro operation of the lever E by means of a jointed pivoted arm connected therewith on the outer side of the wall $B^2$ and elbow-joint I, secured by means of the bracket I' and pivoted thereto by the pin $i$. The lower end of the lever E is connected with the inner end of the elbow-joint I by means of the jointed arm $e'$ $e^2$. A pivoted arm $j$ is secured to the outside wall $B^2$ through the medium of the bracket $j'$ and pivoted thereto at $j^2$. The arm $j$ is connected with the shaft F through the medium of the jaw $j^3$ and grooved collar $f^2$, provided on the shaft F. The said lever $j$ is connected with the outer end of the elbow-joint I through the medium of the jointed plate $i^2$. As the lever E is thrown to the left in the position shown in the dotted lines, Fig. 3, the shaft F, through the medium of the connections described, is thrown outward, and the small gear-wheel $f'$, provided on the shaft, is thrown into gear with the toothed wheel $h$, provided on the shaft H, and the power being thus communicated the shaft F is therefore operated in a given direction. When, however, the lever E is thrown into the position shown in the dotted lines to the right of Fig. 3, the shaft is shifted laterally, so that the gear-wheel $f'$ becomes disengaged and the large gear-wheel $f$ becomes engaged with the gear-wheel $h'$, provided on the shaft H', which said wheel $h'$ operates, as will be seen by the drawings, in the opposite direction from the gear-wheel $h$, to which $f'$ was previously connected, and consequently operates the shaft F in a reverse or opposite direction to that given it by the wheel $f'$. When the lever E is in the vertical position shown in Fig. 3, the shaft F becomes so adjusted that its gear-wheels $f f'$ are disengaged from the gearing to the motor, and consequently are at a standstill. It will thus be seen that as the vehicle is driven from the shaft F, directly or indirectly, the direction of the vehicle may be changed, or it may be brought to a standstill by the operation of the lever E.

As before stated, I preferably employ on my motor, as a regulator or brake, my improved air-governor, substantially as described and claimed in my pending application, Serial No. 355,417, which is shown in the drawings in connection with my improved motor herein described, although other governors, brakes, or regulating devices may be employed.

K represents the air-cylinder, connected with the shaft H' by means of a piston-rod and a crank provided on said shaft H'.

V is the valve, provided on the outside of the wall $B^2$ of the motor, which regulates the opening and closing of the mouths of the ports connected, respectively, by the tubing $t$ $t'$ with the cylinder K at either end, which valve V is adapted to be opened and closed by the lever L. When the ports of the valves are closed, the piston-head within the cylinder K, pressing against the air and at the same time producing a suction, is prevented from operating, and the machine is consequently brought to a standstill. When the ports of the valve V are opened, the air within the cylinder K is allowed to escape and to be pumped in alternately, according to the extent of the exposure of the mouths of the ports, which are formed in thin narrow slits, and the speed of the motor is thereby regulated. A fly-wheel W is provided on the shaft H' as a balance-wheel. The lever M is provided on the outside of the wall $B^2$, having a pawl adapted to fit in a ratchet-wheel provided on the shaft H' for preventing the motor from operating, should necessity require its use. Each of the levers M L E is provided with a pawl and toothed rack for the purpose of holding the respective levers at any desired position.

Having thus described my invention, what I claim, and desire to secure by Letters Patent, is—

1. In a spring-motor, two or more revoluble drums, a series of springs mounted on each drum, toothed gear-wheels mounted on and connecting said drums, small gear-wheels connected with the gearing on the drums, a shaft carrying small gear-wheels, said shaft adapted to receive the force of said springs, gearing for communicating said force to a device to be driven, an intervening mechanism for reversing the motion of the device to be driven, and winding mechanism for winding said springs, as set forth.

2. In a spring-motor, a series of revoluble drums, two or more springs mounted on each drum, toothed gear-wheels mounted on and connecting said drums, small gear-wheels connected with the gearing on the drums, a shaft carrying the small gear-wheels, said shaft adapted to receive the force of said springs, gearing for communicating said force to a device to be driven, an intervening mechanism for reversing the motion of the device to be driven, a speed-regulating mechanism, and winding mechanism for winding said springs, substantially as set forth.

3. In a spring-motor, a series of revoluble drums, each of said drums provided with two or more flat coiled springs, toothed gear-wheels mounted on and connecting each of said drums with two of said revoluble drums, small gear-wheels connected with the gear wheel or wheels of one of said drums, to which the combined force of all the springs of all the said drums is applied, mechanism for transmitting the power therefrom, and an intervening laterally-adjustable revolving shaft provided with gear-wheels of large and small diameter, said wheels adapted to engage at different times with different gear-wheels provided on different shafts of the motor, said shaft laterally adjustable by means of a lever for regulating the direction of the revolving parts and winding mechanism.

4. A spring-motor having revoluble drums A A' $A^2$ $A^3$, flat coiled springs provided thereon, large gear-wheels G, adapted to engage in smaller gear-wheels, shaft $c$, and gear-wheels C, engaging in said gear wheel or wheels G, mechanism for transmitting the power, speed-regulating and power-controlling mechanism provided with air-cylinder K, connected by piston and shaft to crank-shaft of balance-wheel, valve V, tubular connections $t$, a lever L, laterally-adjustable shaft F, wheels $ff'$, adapted to engage and disengage with other and different rotating gear-wheels of the motor at different times, a lever E, operating and controlling the lateral adjustment of the shaft F by arms and elbow connection, and winding mechanism, substantially as described.

In witness whereof I have hereunto set my hand this 16th day of July, A. D. 1890.

FRANK BRIGGS.

Witnesses:
J. BAYARD HENRY,
R. M. FLEISCHMANN.